United States Patent [19]

Marcozzi

[11] 3,880,791

[45] Apr. 29, 1975

[54] CROSS LINKABLE THERMOPLASTIC ADHESIVES

[75] Inventor: Arthur J. Marcozzi, Franklin Township, Westmoreland County, Pa.

[73] Assignee: United States Steel Corporation, Pittsburgh, Pa.

[22] Filed: May 31, 1973

[21] Appl. No.: 365,776

[52] U.S. Cl.... 260/28.5 AS; 156/337; 260/28.5 AV; 260/897 B
[51] Int. Cl. ............................................. C08f 45/52
[58] Field of Search .. 260/28.5 AS, 28.5 AV, 897 B

[56] References Cited
UNITED STATES PATENTS

| 3,361,692 | 1/1968 | Parkinson | 260/28.5 AV |
| 3,410,928 | 11/1968 | Baum | 260/897 B |

FOREIGN PATENTS OR APPLICATIONS 1,087,286  8/1966  United Kingdom

Primary Examiner—Melvyn I. Marquis
Attorney, Agent, or Firm—William L. Krayer

[57] ABSTRACT

Compositions are disclosed for makng thermoplastic adhesives and coatings. The compositions include coal tar pitch and two copolymers of ethylene in which the copolymers are cross-linked with dicumyl peroxide.

5 Claims, No Drawings

CROSS LINKABLE THERMOPLASTIC ADHESIVES

BACKGROUND OF THE INVENTION

Prior to this invention that has been known to make adhesives and coating compositions using coal tar pitch and certain ethylene polymers such as copolymers of ethylene with acrylic acid and copolymers of ethylene with vinyl acetate. Such coatings and adhesives have been generally successful, but they suffer from a significant defect in that the creep resistance is unsatisfactorily low.

Creep resistance is a dimensional change which is caused under loads and is a function of time and temperature. Although in some applications a certain amount of creep is tolerable or even useful, in most applications the creep effect is undesirable since the coating or adhesive is gradually weakened and the bond is ultimately destroyed. My invention relates to the use of a particular cross-linking agent in the pitch/ethylene copolymer composition.

Cross-linking of polymers is not new. For example, in UK Pat. No. 1087286, the cross-linking of ethylene/acrylic acid copolymers and ethylene/vinyl acetate copolymers is described. In particular, the use of dicumyl peroxide is disclosed in the fourth line of the top of Page three. See also French Pat. No. 1488913.

Pitch derived from coal tar is used in combination with various polymers including ethylene copolymers in U.S. Pat. Nos. 3,267,083, 3,309,329, 3,392,132, 3,402,742, and 3,318,977. In addition, the reader may be interested in the following U.S. Pat. Nos.: 3,402,223, 3,410,928, 3,425,981, 3,503,914, 3,577,365, and 3,654,207.

So far as I am aware, no one has proposed to incorporate or has incorporated into a single composition a coal tar pitch, ethylene/vinyl acetate copolymers and ethylene/acrylic acid copolymers (EVA and EAA) including a cross-linking agent such as dicymyl peroxide, nor has anyone previous to this invention disclosed that the use of dicumyl peroxide has a cross-linking agent will not only cross-link the polymers used in such compositions but will greatly inhibit the tendency to creep.

SUMMARY OF THE INVENTION

The preferred method for reducing creep in this series of adhesives comprising EVA and EAA copolymers is to cross-link the polymer chains with dicymyl peroxide. The chemical links thus established between molecular chains increase resistance to plastic flow. Useful copolymers are those having a vinyl acetate content between about 5% and 50% by weight, perferably between about 15% and 40% by weight. Useful copolymers are those having a melt index between about 0.2 and 500, preferably between about 0.5 and 175. The term "Elvax 260" used herein means a copolymer of 72% by weight ethylene and 28% vinyl acetate.

Useful ethylene-acrylic acid copolymers may vary in melt index from about 0.1 to about 400, the preferred range being between about 5 and 40. The acid content of useful copolymers may range between about 0.1% and 75% by weight of the copolymer. The acid range of commercially available copolymers with acrylic acid is between about 0.1% and 40% by weight of the copolymer. The preferred acid range of the latter is between about 2% and 20%.

Experimentation showed that both EVA and EAA are affected by dicumyl peroxide [$C_6H_5$—$C(CH_3)_2$—$O]_2$, an organic peroxide cross-linking agent. Generally, cross-linkable adhesives are produced in this disclosure by blending the peroxide with the pitch-EVA-EAA combinations, then processing the mixture into desired form (tape, rod, pellets) by any convenient method as, for example, extruding. The peroxide-containing blend can then be cross-linked at the point of use by raising the temperature of the blend to decompose the peroxide and consequently trigger the cross-linking reaction. The cross-linking mechanism appears to be one of hydrogen abstraction, and although we do not intend to be bound by any theories, probably occurs at the ethylene units of the copolymers. Since two copolymers having ethylene units are involved, cross-linking does not necessarily occur with only EVA ethylene units or just EAA ethylene units. Ethylene units of both copolymers may be available for linkage.

Dicumyl peroxide itself and its radicals do not enter into the molecular structure resulting from the cross-link reaction. They serve only to initiate the reactions. All of the peroxide is converted to dimethylbenzyl alcohol, acetophenone and methane. Since dicumyl peroxide does not enter the molecular structure of either copolymer, the pitch-polymer blend can be cross-linked without altering adhesive properties. Generally the cross-link reaction rate can be increased or decreased by changing the temperature at which the reaction is carried out. The preferred temperature range is 320°–550°F. The degree of cross-link is determined by the amount of peroxide used in the blend.

Although other peroxides can be used to cross-link these blends, these factors must be considered when selecting a peroxide cross-linking agent:

1. peroxide decomposition products do not enter the molecular structure to alter the properties of the adhesive;
2. decomposition temperature of the peroxide is high enough (i.e., above 300°F) so that cross-linking will not occur during processing (milling, extruding, etc.);
3. peroxide blends well with the cross-linkable material.

Dicumyl peroxide meets the above requirements in that:

1. its decomposition products apparently do not enter the molecular structure of either copolymer;
2. its decomposition temperature (which should be at least 300°F) will permit processing at about 350°F at reasonable time intervals without significant cross-linking during processing;
3. as a solid at room temperature, it blends well with pitch-polymer adhesives.

Dicumyl peroxide satisfied the above desired criteria. It is commercially available (Hercules, Inc., Wilmington, Delaware) in these forms:

| Grades | Composition |
| --- | --- |
| Di-Cup T | 90 to 93% active dicumyl peroxide |
| Di-Cup R | 96 to 100% active dicumyl peroxide |
| Di-Cup 40C | 39.5 to 41.5% active dicumyl peroxide supported on precipitated calcium carbonate |
| Di-Cup 40KE | 39.5 to 41.5% active dicumyl peroxide supported on Burgess KE clay |

All grades can be blended with the pitch-polymer series of thermoplastic adhesives. Peroxide content depends on the degree of cross-link desired. About 0.5 to 10% of peroxide based on polymer weight is satisfactory in our invention. The most probable commercial range would be 2.0 to 5.0%.

A pitch suitable for the purposes of the invention is preferably that derived from coal tar. Useful pitches range in ring-and-ball softening points between about 70° and 200° C, a preferred range being between about 100° and 150° C.

EFFECT OF DICUMYL PEROXIDE ON PITCH-POLYMER THERMOPLASTIC ADHESIVES

Creep Resistance

Although creep-resistance improvement with cross-linking has not been directly evaluated, an indication of change in flow under controlled conditions can be obtained by means of melt index data. Melt index is defined as the weight in grams (g) extruded in 10 minutes through a specified orifice at 190° C by a loaded piston weighing 2160 g. It is measured by means of a melt index device (F. F. Slocum Corp., Wilmington, Delaware) and is expressed as g/10 min. The following melt index results for various ethylene/EVA and ethylene/EAA compositions with and without peroxide treatment, indicate the reduction in flow by cross-linking.

| Sample | Melt Index |
|---|---|
| Composition A (no peroxides) | 11.9 g |
| Composition A + Di-Cup R (2%) | 0.58 g |
| Composition A + Di-Cup R (5%) | 0.008 g |
| Composition B (no treatment) | 12.9 g |
| Composition B + Di-Cup R (2%) | 2.3 g |

Formulas for Composition A and B are as follows:
A. ⅓ pitch, ⅓ Elvax 260, ⅓ copolymer of ethylene and 6.8% by weight acrylic acid.
B. 40% pitch, 60% Elvax 260.

Plastograph Studies

Results from plastograph tests in which materials are subjected to severe shear action, show evidence of cross-linking. Resistance to shear is increased in Composition A immediately after dicumyl peroxide is added. The time-torque relationship of Composition A has been tested before and after adding dicumyl peroxide at 1 part per hundred resin (phr) and 5 phr. Initially, untreated Composition A shows a torque of about 2700 meter-gms at 160° C (40 rpm). About 7 minutes after dicumyl peroxide is added at 5 phr, the torque increased to about 5000 meter-gms. A similar action results at 1 phr, but torque does not increase as with 5 phr.

The rapid increase in torque after addition of dicumyl peroxide is probably caused by cross-linking of the copolymer chains.

Although the chief objective of the invention is to reduce the creep property of the pitch-polymer blend, an unexpected benefit was obtained. In order to evaluate the effect of cross-linking on the adhesive properties of Composition A, the peel strength of cross-linked and untreated Composition A were compared at various temperature levels. Cross-linked Composition A exhibited much higher strengths than untreated Composition A especially at elevated and low temperatures.

The following data illustrate this.

| Sample | Peel Strength, ppi | | |
|---|---|---|---|
| | −60 F | 80 F | 200 F |
| Composition A (no treatment) | 20 | 75 | 0 |
| Composition A + Dicumyl peroxide, 58% by weight | 98 | 80 | 19 |

All samples were bonded at 500° F for 3 min. The peroxide-containing Composition A used in making the peel test samples had been extruded into a 4-inch-wide, 0.017-inch-thick tape prior to use. Complete cross-linking took place during the heat cycle used in making the peel samples (550° F, 3 min.).

The following preferred pitch-polymer-peroxide blends illustrate the invention:

EXAMPLE 1 a. 5 lbs. pitch 140° C
b. 5 lbs. Elvax 260
c. 5 lbs. EAA (Copolymer of ethylene and 6.8% acrylic acid)
d. 56.75 gms Di-Cup 40° C Ingredients (a), (b), (c), and (d) were mixed in a twin-shell blender then extruded into a 4-inch-wide, 0.017-inch-thick tape at 300° F.

EXAMPLE 2 a. 15 lbs. Composition A pellets
b. 227 gms dicumyl peroxide

Ingredients (a) and (b) were mixed in a twin-shell blender then extruded into a 4-inch-wide, 0.017-inch-thick tape at 300° F.

EXAMPLE 3 a. 2 lbs. pitch, 140° C
b. 2 lbs. Elvax 260
c. 2 lbs. (EAA as defined in Example 1)
d. 90.8 gms Di-Cup R Ingredients (a), (b), (c), and (d) were mixed in a twin-shell blender then extruded into ⅛-inch diameter rod at 300° F. The rod was chopped into pellets.

EXAMPLE 4 a. 2 lbs. pitch, 140° C
b. 2 lbs. Elvax 260
c. 2 lbs. (EAA as defined in Example 1)
d. 136.5 gms Di-Cup 40° C (this is equivalent to 3%)

Ingredients (a), (b), (c), and (d) were mixed in a twin-shell blender then extruded at 300° F into ⅛-inch diameter rod. The rod was pelletized.

EXAMPLE 5 a. 2 lbs. pitch, 140° C
b. 2 lbs. Elvax 260
c. 2 lbs. (EAA as defined in Example 1)
d. 54.5 gms Di-Cup R - 3%

Ingredients (a), (b), (c), and (d) were mixed in a twin-shell blender then extruded at 300° F into ⅛-inch diameter rod. The rod was then pelletized.

The use of an extruded tape or other form of my composition comprises a novel method of adhering surfaces wherein the adhesive composition is formed into a planar shape corresponding to the surfaces to be joined, at a temperature above the melting point of the resins but below the decomposition temperature of the dicumyl peroxide. After application to the surfaces to be joined, it is heated to the decomposition temperature of dicumyl peroxide and then cooled.

We claim:

1. A composition useful for coatings comprising
   a. about 25 to 50 percent pitch having a ring-and-ball softening point between about 70° and 200° C
   b. about 20 to 40 percent copolymer of ethylene and vinyl acetate in which the ethylene comprises from 50 to 95% by weight
   c. about 20 to 40 percent copolymers of ethylene and acrylic acid in which the ethylene comprises from 25% to about 99.9% by weight, having a melt index from about 0.1 to about 400 and
   d. about 0.5 to 10% dicumyl peroxide.

2. An extruded tape of the composition of claim 1.

3. Composition of claim 1 wherein the ethylene-acrylic acid copolymer contains from about 2 to about 20% acrylic acid by weight.

4. Composition of claim 1 in which the dicumyl peroxide is present in an amount from about 2 to about 5% by weight.

5. Composition of claim 1 in which the pitch has a ring-and-ball softening point between about 100° and 150° C.

* * * * *